United States Patent Office 2,756,158
Patented July 24, 1956

2,756,158

GLASS COMPOSITION

William P. Hahn and Edward R. Powell, North Plainfield, N. J., assignors to Johns-Manville Corporation, New York, N. Y., a corporation of New York No Drawing. Application September 9, 1952, Serial No. 308,712

5 Claims. (Cl. 106—50)

This invention relates to a glass composition, and more particularly to a glass composition which may be employed to produce stable glass fibers of very fine fiber diameter.

It has been common practice in the manufacture of glass fibers to employ compositions excluding or minimizing alkaline oxides. Fibers which are sufficiently fine for use as thermal insulation, glass textiles, air filters, and the like, have a tremendous surface area subject to attack by deleterious agents, including water. Glass fibers containing a substantial amount of alkali suffer severe deterioration when exposed to moisture. Water absorbed from the atmosphere dissolves the alkali, and the caustic solution thus formed proceeds to attack the glass, thereby exposing additional alkaline materials to the atmosphere; and the thus proceeding cycle results in complete deterioriation of the fiber.

Various alkali-free or alkali-minimized glass compositions have been developed to render the fibers stable in the presence of moisture. While alleviating this problem, these compositions have raised additional complications during fiberization and with the finally formed fibers. Such compositions have an extremely high fiberizing temperature, somewhere in the range of approximately 2300–2500° F., as compared to well-known alkali glass compositions such as that of conventional plate glass which may be fiberized within a temperature range of approximately 1700–2000° F.

Elevated fiberizing temperatures for such alkali-free glasses render difficult, if not impossible, the use of some convenient fiberizing procedures. Exemplary of such procedures are those containing the steps of drawing a portion of the melt through an orifice or bushing to form filaments which may be utilized in this form or further attenuated by various methods, or the step of mechanically drawing fibers through the coaction of a plurality of rotors. All metallic parts, such as bushings, orifice plates, rotors, etc. required in such procedures, which come in contact with such alkali-free glass melts, must be fabricated from high temperature noble metal such as platinum, palladium, or the like, in order to withstand these elevated temperatures.

In addition to the obvious high cost due to the necessity for such precious metal apparatus parts, fiberization of an alkali-free glass composition is also rendered extremely difficult due to the devitrification characteristics of the melt. Such glass compositions have only short and extremely high temperature ranges in which the viscosity is suitable fo fiberization, thereby requiring extremely precise temperature controls. The devitrification characteristics of such a melt render difficult the formation of long, fine, clean fibers within this short span of fiberizing temperatures by all techniques in which the glass must remain within the fiberizing temperature range for any appreciable length of time.

Accordingly, it is an object of this invention to provide a glass composition which may be employed to produce stable, long glass fibers of very fine fiber diameter.

It is a further object of this invention to provide a glass composition having viscosity-temperature characteristics enabling fiberization under conditions comparable to those required with well-known glass compositions such as conventional plate glass.

It is an additional object of this invention to provide a glass composition enabling the formation of fine diameter glass fibers which are stable in the presence of moisture.

It is another and more specific object of this invention to provide a glass composition which may be utilized to form fine glass fibers having a low alkalinity value, at fiberizing temperaturs substantially less than 2000° F.

With the above and other objects and features in view, the invention consists in the improved glass composition hereinafter described and more particularly defined by the accompanying claims.

This invention consists primarily in a relatively narrow range of glass compositions which may be fluidized to proper fiberizing consistency at a temperature substantially below that requiring apparatus elements fabricated from high temperature noble metals such as platinum, palladium, etc., and yet which will result in the formation of fine, long glass fibers which are moisture-stable and have an alkalinity value sufficiently low to meet the requirements of the U. S. Government Military Specification No. MIL–F–1228, dated September 12, 1949; that is, have an alkalinity value not exceeding 0.25% $Na_2O$ equivalent.

The glass compositions of this invention essentially comprise the following ingredients in the approximate percentages, by weight, indicated:

| | |
|---|---|
| $SiO_2$ | 61–66 |
| Alkali oxides | 7–12 |
| Alkaline earth oxides | 5– 8 |
| Iron oxides | 5–12 |
| $B_2O_3$ | 5– 8 |
| $Al_2O_3$ | 5– 8 |

For best results, we have found that the iron component should comprise a substantial proportion, and preferably approximately 40–60%, of iron oxide in the ferric state. It is satisfactory to introduce the iron as ferriferrous oxide or magnetite and preserve this oxidation condition through the glass making process. The iron oxides present, particularly in such a state of oxidation, apparently serve to stabilize the alkali oxides of the melt composition. This phenomenon is apparently due to the inhibition of reaction between moisture and free alkali at the fiber surface because of the presence, at the surface, of ferric ions.

In the formation of the initial glass melt, the heretofore indicated oxides may be employed in the relatively pure state or may be added in the form of beneficiated furnish materials such as metallurgical and smelting slags, rocks, and other natural minerals. It has been found that the relatively small amount of elements commonly associated with such materials do not have an adverse effect upon either the viscosity-temperature characteristics of the melt or the finally formed glass fiber due to the relatively broad fiberizing temperature range of these compositions. In fact, in many instances, impurities often present in these materials such as phosphorus pentoxide, manganese dioxide, sulfur, fluorine, etc., have the effect of somewhat reducing the viscosity of the melt without adversely altering the characteristics of its viscosity-temperature curve, thereby enabling fiberization at lower melt temperatures. Obviously, no furnish material containing a substantial amount of an impurity which will seriously alter the viscosity-temperature curve and hence fiberizing characteristics of the glass composition, should be employed.

The glass compositions formed in accordance with this invention may be fluidized to a fiberizing consistency with any conventional glass melting furnace. While electric furnaces may be employed to melt the glass, it is of particular note that such high temperature furnaces are not required to obtain proper viscosities enabling fiberization. As heretofore indicated, with the glass compositions of this invention, optimum viscosity-temperature characteristics are obtained at temperatures of approximately 1700–2000° F. These melt conditions may be obtained, therefore, with conventional fuel fired furnaces, such as those employing a gas-air combustion stream.

A typical specific example of a glass, in percentages by weight, which has been found very satisfactory in the formation of glass fibers having a fine diameter of approximately 2–3 microns and an alkalinity value of less than 0.25% $Na_2O$ equivalent under the standard test conditions outlined in MIL-F-1228 is as follows:

| | |
|---|---|
| $SiO_2$ | 63 |
| Alkali oxides | 11 |
| Alkaline earth oxides | 7 |
| Iron oxides | 6 |
| $B_2O_3$ | 7 |
| $Al_2O_3$ | 6 |

In the specific composition the alkali oxide content comprised $Na_2O$ and $K_2O$ in the ratio of approximately 10:1, and the alkaline earth oxide content essentially consisted of CaO. The iron oxides were introduced to the melt as magnetite of ferriferrous oxide, and the desired condition of oxidation was obtained during the melt procedure. The fibers obtained by the use of coacting rotors were relatively long and showed no substantial deterioration due to devitrification characteristics of the composition.

Glasses made in accordance with this invention may obviously be formed into the usual pressed, blown or extruded objects, but the composition is particularly adapted for the formation of fine fibers. Such fine fibers may be formed by various methods known in the art, as, for example, by flame attenuation in accordance with the procedure outlined in U. S. Patent No. 2,133,236 and mechanical drawing of fibers according to the procedure outlined in U. S. Patent No. 2,234,986.

In view of the low temperature fiberizing characteristics of the melt, however, the compositions are particularly adapted for formation of fine fibers with procedures and apparatus employing base metal parts. The glass compositions are specifically adapted for use in the fiberizing procedures and apparatus disclosed and claimed in Powell Patents Nos. 2,605,499, 2,605,500, and 2,605,503 and copending Powell application Ser. No. 301,623, filed July 30, 1952; which all disclose drawing fine glass fibers from a molten glass furnish supplied to a plurality of coacting base metal rotors.

Glass fibers produced from the composition of this invention by the above methods may be extremely fine. For example, when employing the procedures disclosed by Powell, fiber diameters of approximately 2–3 microns may be obtained. The fibers formed are particularly adapted for use as thermal insulation, either loose or in bonded form, and may be employed for other known uses, such as plastic reinforcement, etc.

It will be understood that the details given are for the purpose of illustration, not restriction, and that variations within the spirit of the invention are intended to be included in the scope of the appended claims.

What we claim is:

1. Glass in the form of fine fibers consisting essentially of the following ingredients in the indicated approximate percentages by weight:

| | |
|---|---|
| $SiO_2$ | 61–66 |
| Alkali oxides | 7–12 |
| Alkaline earth oxides | 5–8 |
| Iron oxides | 5–12 |
| $B_2O_3$ | 5–8 |
| $Al_2O_3$ | 5–8 |

2. Glass in the form of fine fibers consisting essentially of the following ingredients in the indicated approximate percentages by weight:

| | |
|---|---|
| $SiO_2$ | 63 |
| Alkali oxides | 11 |
| Alkaline earth oxides | 7 |
| Iron oxides | 6 |
| $B_2O_3$ | 7 |
| $Al_2O_3$ | 6 |

3. Glass in the form of fine fibers consisting essentially of the following ingredients in the indicated approximate percentages by weight:

| | |
|---|---|
| $SiO_2$ | 63 |
| $Na_2O$ | 10 |
| $K_2O$ | 1 |
| CaO | 7 |
| $Fe_3O_4$ | 6 |
| $B_2O_3$ | 7 |
| $Al_2O_3$ | 6 |

4. Glass in the form of fine fibers consisting essentially of the following ingredients in the indicated approximate percentages by weight:

| | |
|---|---|
| $SiO_2$ | 61–66 |
| Alkali oxides | 7–12 |
| Alkaline earth oxides | 5–8 |
| Iron oxide—40 to 60% of which is $Fe_2O_3$ | 5–12 |
| $B_2O_3$ | 5–8 |
| $Al_2O_3$ | 5–8 |

5. Glass in the form of fine fibers consisting essentially of the following ingredients in the indicated approximate percentages by weight:

| | |
|---|---|
| $SiO_2$ | 63 |
| Alkali oxides | 11 |
| Alkaline earth oxides | 7 |
| Iron oxide—40 to 60% of which is $Fe_2O_3$ | 6 |
| $B_2O_3$ | 7 |
| $Al_2O_3$ | 6 |

References Cited in the file of this patent

UNITED STATES PATENTS

| 974,801 | Kraus | Nov. 8, 1910 |
| 2,308,857 | Bowes | Jan. 19, 1943 |
| 2,582,852 | Shoemaker | Jan. 15, 1952 |